(No Model.)
J. DEUBEL.
COFFEE MILL.
No. 249,507. Patented Nov. 15, 1881.
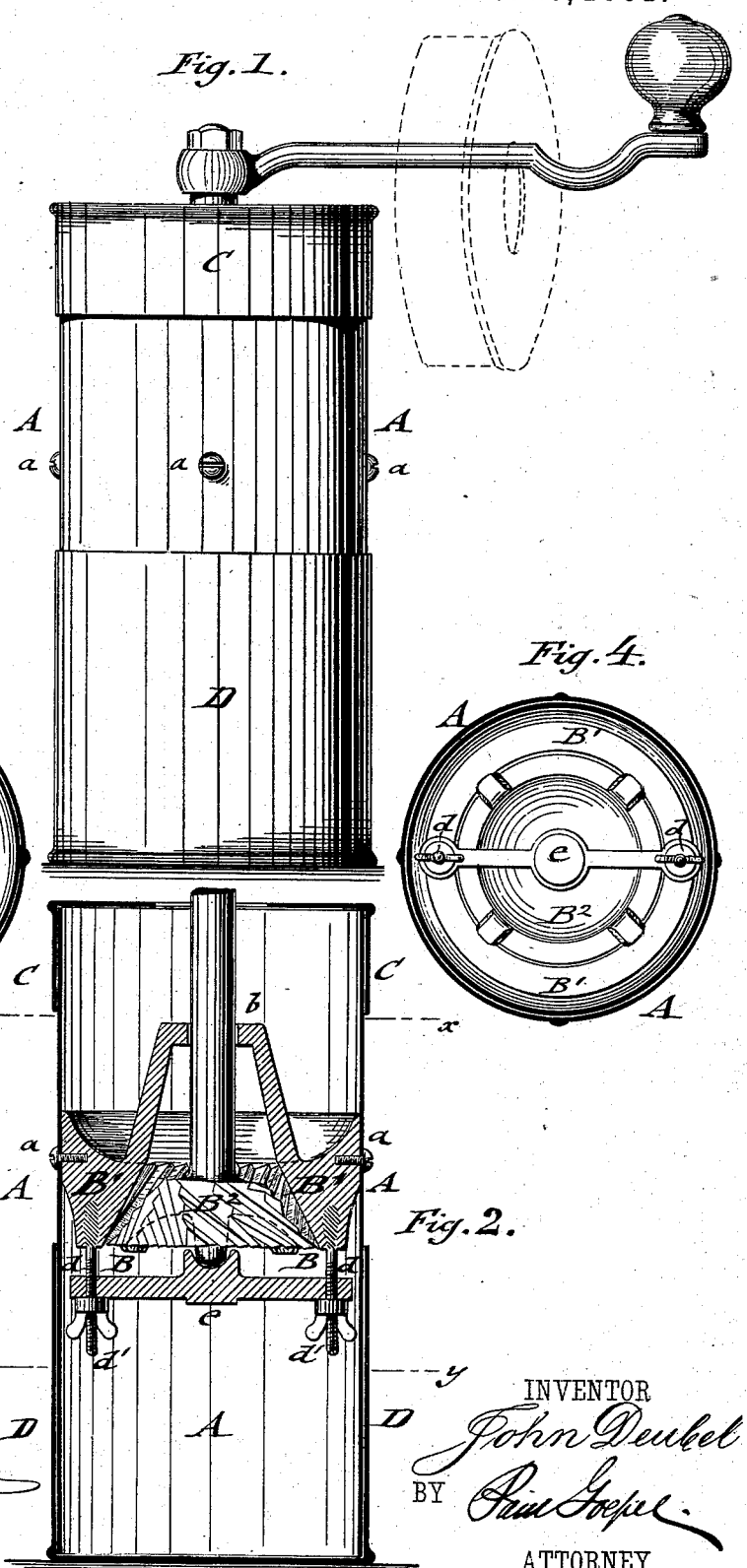

UNITED STATES PATENT OFFICE.

JOHN DEUBEL, OF JERSEY CITY, NEW JERSEY.

COFFEE-MILL.

SPECIFICATION forming part of Letters Patent No. 249,507, dated November 15, 1881.

Application filed July 9, 1881. (No model.)

*To all whom it may concern:*

Be it known that I, JOHN DEUBEL, of Jersey City Heights, in the county of Hudson and State of New Jersey, have invented certain new and useful Improvements in Coffee-Mills, of which the following is a specification.

The object of this invention is to furnish for family use an improved portable coffee-mill of cheap and simple construction, into which the beans are charged at the top and the ground coffee removed at the bottom.

In the accompanying drawings, Figure 1 represents a side view, and Fig. 2 a vertical central section, of my improved coffee-mill; and Figs. 3 and 4 are respectively a top view and a bottom view of the grinding mechanism, partly in section, through the inclosing casing on lines $x\ x$ and $y\ y$, Fig. 2.

Similar letters of reference indicate corresponding parts.

My improved coffee-mill consists of two main parts, a cylindrical sheet-metal shell or casing, A, provided with a removable lid and bottom, and an interior grinding mechanism, B, which is tightly secured to the outer casing. The lid C has a central opening around the shaft of the grinding mechanism, which opening is made wide enough so that the lid may be passed over the grinder-shaft and the hand-crank of the same, as shown in dotted lines in Fig. 1, for charging the grinding mechanism with coffee-beans. The bottom D is made of cup shape and large enough to hold a considerable quantity of coffee ground in the mill.

The grinding mechanism consists of a cast-metal bed-plate, B', which is secured to the cylindrical frame A by means of fastening-screws $a\ a$. The bed-plate B' is cast in one piece with a neck-bearing, $b$, for the shaft of the grinder $B^2$, and provided at the under side with fixed downwardly-extending screws $d$ at diametrically opposite points, for the support of the step-bearing $e$ of the same, which step-bearing is made vertically adjustable by means of screw-nuts $d'$, so as to set the grinder $B^2$ closer to or farther away from the bed-plate for regulating thereby the degree of fineness of the ground coffee.

The coffee-mill is used in the following manner: The lid is removed from the casing and thrown over the crank-handle to admit the putting therein of the beans from above, after which the lid is replaced into its former position. The beans are then ground by revolving the crank-handle, the frame being held in any suitable position, either in the hands or between the legs, or otherwise, as desired. When the beans are ground the bottom part is removed and the ground coffee placed in the coffee-pot.

The coffee-mill is made entirely of metal, no wood being used, and is consequently strong and durable, being, also, more compact and easier handled. Neither beans nor ground coffee can escape, as the mill is reliably inclosed. The coffee-mill takes up but a small space, and can therefore be stored away in a convenient manner.

Having thus described my invention, I claim as new and desire to secure by Letters Patent—

As an improvement in a coffee-mill, the grinding mechanism consisting of an interior grinding nut and shaft, a fixed outer bed-plate and neck-bearing cast in one piece and secured to a cylindrical casing by screws, in combination with the adjustable step-bearing device consisting of a bar having a step cast in its center to receive the end of the shaft, and thumb-screws operated on screw-bolts extending downward from the bottom of the bed-plate for raising and lowering the grinding-nut, substantially as described.

In testimony that I claim the foregoing as my invention, I have signed my name, in presence of two witnesses, this 25th day of June, 1881.

JOHN DEUBEL.

Witnesses:
PAUL GOEPEL,
CARL KARP.